United States Patent
Machleder et al.

(10) Patent No.: US 6,300,407 B1
(45) Date of Patent: *Oct. 9, 2001

(54) POLYMERIC (METH)ACRYLATE PLASTICIZERS AND PROCESSING AIDS FOR ELASTOMERS

(75) Inventors: Warren Harvey Machleder, Blue Bell; Robert Howard Gore, Southampton, both of PA (US); David Sterett Moorman, Baytown, TX (US); Michael Damian Bowe, Newtown, PA (US)

(73) Assignee: Rohm and Haas Company, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 79 days.

(21) Appl. No.: 09/244,181

(22) Filed: Feb. 4, 1999

Related U.S. Application Data

(60) Provisional application No. 60/077,059, filed on Mar. 6, 1998.

(51) Int. Cl.$^7$ ............................ C08L 21/00; C08L 33/02; C08L 33/14; C08J 3/18
(52) U.S. Cl. .................. 524/515; 524/522; 524/523; 524/525; 524/528; 525/192; 525/221; 525/223; 525/227; 525/230; 525/241
(58) Field of Search .................................. 524/515, 522, 524/523, 525, 528; 525/192, 221, 223, 227, 230, 241

(56) References Cited

U.S. PATENT DOCUMENTS

| | | |
|---|---|---|
| 2,389,959 | 11/1945 | Dean . |
| 3,833,689 | * 9/1974 | Usamoto et al. ............... 260/897 |
| 4,056,559 | 11/1977 | Lewis et al. . |
| 4,094,927 | * 6/1978 | Harrop et al. ............... 260/897 B |
| 4,103,093 | 7/1978 | Lewis et al. . |
| 4,158,736 | 6/1979 | Lewis et al. . |
| 4,246,370 | 1/1981 | Lewis et al. . |
| 4,336,345 | * 6/1982 | Lewis et al. ............... 525/107 |
| 4,356,288 | 10/1982 | Lewis et al. . |
| 5,026,807 | * 6/1991 | Ohira et al. ............... 526/321 |
| 5,112,725 | 5/1992 | Kurtz et al. . |
| 5,321,073 | 6/1994 | Kondo et al. . |
| 5,612,418 | * 3/1997 | Manley et al. ............... 525/222 |
| 5,672,639 | * 9/1997 | Corvasce et al. ............... 524/52 |

FOREIGN PATENT DOCUMENTS

| | | | |
|---|---|---|---|
| 61200135 | * 9/1986 | (JP) | ............... 525/296 C |
| 422260 | * 3/1977 | (RU) | ............... C08K/5/10 |
| 973565 | * 9/1982 | (RU) | ............... C08K/5/53 |

OTHER PUBLICATIONS

Panchenko et al., "Effect of Esters of Methacrylic Acid and Alcohols (C7–C12) on the Properties of Vulcanized Rubber Mixtures and Vulcanized Rubber Based on SKD", Kauch. i Rezina (4), pp. 24–26 (1979).*

DuPont UK LTD. Research Disclosure 211022, Abstract XP002106127, Nov. 10, 1981.*

Translation of JP61200135 by Saito, Nakagawa, etc., Sep. 4, 1986.*

SU 973,565A (Lengd Lensovet Tech) Abstract XP002106036, Nov. 15, 1982.

JP 91 200135A (Sanyo Chem Ind Ltd) Abstract XP002106127, Sep. 4, 1986.

(DU PONT UK LTD.) Abstract XP00210637, Nov. 10, 1981, (RD 211022).

"An Elastomeric Acrylate Terpolymer for TPE Modification". Paper No. 40, The Goodyear Tire and Rubber Co., Oct. 10, 1996.

"Soft Prosthesis Materials Based on Powdered Elastomers", Sandra Parker and M. Braden Biomaterials 1990, vol. 11, Sep. (pp. 482–490).

Translation—Kauch I Rezina (4), 24–26, (1979); "Effect of Esters of Methacrylic Acid and Alcohols ($C_7$–$C_{12}$) on the Properties of Vulcanized Rubber Mixtures and Vulcanized Rubber Based on SKD" by Panchenko, V.I., et al.

Abstract—*Methacrylates in Polychloroprene Compositions*, No. 21122, Nov. 10, 1981, PN–RD211022.

ACS Symposium Series, 195$^{th}$ National Meeting of the American Chemical Soc., Toronto, Ontario, Canada, Jun. 5–11, 1998; "Multiphase Polymers: Blend and Ionomers"(pp. 475–502).

* cited by examiner

Primary Examiner—David W. Wu
Assistant Examiner—Kelechi Egwim
(74) Attorney, Agent, or Firm—Alan Holler

(57) ABSTRACT

An elastomer composition, including: at least one elastomer; a plasticizer which includes at least one polymeric material having a weighted average molecular weight of (Mw) of 500 to 1,000,000, formed from at least one ethylenically unsaturated monomer, and a curing agent, wherein the at least one polymeric material is substantially permanent within the elastomer. The subject elastomer compositions have enhanced plasticity and processability without attendant migration, heat or solvent extraction and compatibility problems.

15 Claims, No Drawings

POLYMERIC (METH)ACRYLATE PLASTICIZERS AND PROCESSING AIDS FOR ELASTOMERS

This application claims priority from provisional application No. 60/077,059, filed Mar. 6, 1998.

The present invention relates to elastomer compositions, a process for preparing the same and methods of plasticizing and/or enhancing processability of elastomers. These compositions have enhanced plasticity and processability with reduced loss of plasticizer from extraction or migration.

Elastomers are useful in many fields in a variety of applications. For instance, elastomers are used in the automobile, defense, space, oil drilling and oil recovery industries. Elastomers may be fabricated into tires, seals, gaskets, extruded goods, specialty parts, sheet stock, etc., for use in such industries. Consequently, in such applications, parts fabricated from elastomers may have to be resistant to, for example, fuel, lubricants, extreme temperatures, water, steam, or chemicals. Furthermore, depending on the application, such elastomers may be required to be plasticized to provide low temperature flexibility, as well as enhanced elongation and tensile properties. Also, such elastomers are preferred to have a certain amount of processability for efficient and economical fabrication into the required part.

Plasticizers are added to elastomers to provide or enhance the plasticity of the materials. Specifically, plasticizers are materials which when added to a polymeric material cause an increase in workability and flexibility brought about by a decrease in the glass transition temperature (Tg) of the polymer. Plasticizers are usually of two types, internal and external. Internal plasticizers are made by creating a plasticizing polymer in situ at the same time the polymer is formed. External plasticizers are fully prepared before they are added to the polymer. (Generally, see *Kirk-Othmer Encyclopedia of Chemical Technology,* Vol. 19. pages 258–273 for a discussion of plasticizers.)

Conventional plasticizers, at times, tend to migrate within the elastomer, "bloom" to the surface and "bleed" from the elastomer so that the effective lifetime of a part fabricated from the elastomer is shortened. This migration is excascerbated by the environments in which some of the elastomeric materials are required to operate. Such environments may caused the plasticizer to be extracted from the elastomer. Subsequently, the plasticization decreases and the environment may be polluted with the plasticizer. One conventional approach in overcoming plasticizer migration problems is by the use of plasticizers having a high molecular weight. However, use of such high molecular weight plasticizers results in elastomer compounding problems. That is, it was very difficult to compound and blend the components into a compatible elastomeric composition. Also, the processability of these elastomers suffer.

Conventionally, many chemical compositions have been utilized for the purpose of plasticizing polymers to improve the flexibility, low temperature performance, percent elongation before breaking, Shore A hardness, and resistance to tearing and cracking when impacted. Such physical tests are used as an actual indicator of actual performance in a finished product and are well known in the art. For instance, such physical tests are described in *Rubber Technology,* second edition, Chapters 4 and 5.

Short chain (meth)acrylates have been suggested as plasticizers in rubbers. For instance, hydroxyethyl and hydroxypropyl methacrylates, as well as their alkoxy derivatives, have been suggested as plasticizers in polychloroprene compositions. (See *UK Research Disclosures,* Vol.211, page 403 # 21122 ). Also, $C_8$–$C_{13}$ alkyl methacrylates, as well as 2-ethoxy-ethyl methacrylates combined with powdered elastomers, i.e., natural rubber, styrene-butadiene, or acrylonitrile-butadiene have been suggested as soft acrylic elastomeric compositions for use in dental prosthesis. Such a combination is said to avoid the use of plasticizers. (See Parker, S. and Braden, *Biomaterials* 1990, Vol. 11, September.) Vulcanized rubber was plasticized with $C_7$–$C_{12}$ alkyl methacrylates. (See Panchenko et al Kauch, *I Rezina* (4), 24–26 (1979)). This reference suggests that lower chain methacrylates, i.e., heptyl methacrylate, have the highest plasticizing capacity. In U.S. Pat. No. 5,026,807 a methacrylic acid ester, having a repeating ester group within a long chain alkyl substituent, i.e., between a $C_{3-20}$ alkylene group and a $C_{1-20}$ hydrocarbon group, is used as an elastomer additive. The ester was compounded with a polymer having elasticity to provide a composition having enhanced oil, heat, and low temperature resistance.

Blends of polyacrylate copolymers and terpolymers of $C_4$–$C_8$ alkyl acrylates, $C_1$–$C_3$ alkyl acrylates and $C_2$–$C_{12}$ alkoxyalkyl acrylates and partially hydrogenated nitrile rubbers are disclosed as useful in automobile engine belts, gaskets, seals, etc., in U.S. Pat. No. 5,612,418. However, the disclosed compositions also contain a plasticizer additive, which indicates that the polyacrylates were not considered to have plasticizer properties. Possible use of acrylate and methacrylate polymers as plasticizers is suggested in U.S. Pat. Nos. 4,158,736 and 4,103,093. However, these patents do not disclose specific elastomer compositions or use in elastomer compositions.

None of these references address the problem of plasticizer migration and plasticizer/elastomer compatibility discussed above. Suitable non-migrating plasticizers which are easily compounded with a variety of elastomers, including elastomers, such as fluoroelastomers which are known to be difficult to compound, have heretofore not been disclosed in the prior art. Accordingly, there is a need for a plasticizer for elastomers which has a substantial amount of permanence within the elastomer composition, but which is also compatible with the elastomer and effectively imparts "plastic" properties to the elastomer. An example of this need may be seen in the compounding of acrylic rubber (ACM) at line 1, paragraph 3 on page 930 of Kirk-Othmer, Volume 8 where lower concentrations of plasticizers must be used due to plasticizer loss from volatility at the higher typical ACM service temperatures and/or their partial extractibility by aggressive fluids where ACMs are employed. Other additives are therefor required to improve processibility due to decreased plasticizer levels.

The present inventors have discovered new elastomer compositions which are plasticized by polymeric materials prepared from at least one ethylenically unsaturated monomer and novel processes for preparing the same. The subject elastomer compositions have enhanced plasticity without attendant migration or compatibility problems associated with prior art elastomer compositions. This is true even in elastomeric materials, such as fluoroelastomers, which have heretofore had no or at best very few plasticizers available for use therein.

The polymeric compositions of the elastomer compositions of the present invention are present as interpenetrating networks of polymeric plasticizer and/or processing aids within the elastomer polymer matrix. The polymeric (meth) acrylate chains are trapped within the elastomer thereby having an enhanced permanence within the elastomer. This results in increased life to the plasticized elastomer and the ability to add more filler without bleed out of the filling material. This is accomplished without loss of compatibility between the plasticizer and the elastomer.

In a first aspect of the present invention, there is provided an elastomer composition, including: (A) at least one elastomer; (B) a plasticizer comprising at least one polymeric material, having a weighted average molecular weight (Mw) of 500 to 1,000,000, formed from at least one ethylenically unsaturated monomer, and (C) a curing agent, wherein the at least one polymeric material is substantially permanent within the elastomer.

In a second aspect of the present invention, there is provided a process for preparing an elastomer composition, including: (A) providing a mixture of an elastomer, at least one ethylenically unsaturated monomer or a polymeric material having a weighted average molecular weight of 500 to 1,000,000, formed from at least one ethylenically unsaturated monomer, and a curing agent; and (B) curing the elastomer composition, wherein during curing the at least one ethylenically unsaturated monomer, if present, is polymerized in situ to form an elastomer composition, wherein the at least one polymeric material is substantially permanent within the elastomer.

In a third aspect of the present invention, there is provided a method of plasticizing an elastomer, comprising: (A) providing an elastomer composition according to the present invention, wherein the at least one polymeric material is present in an amount effective to plasticize the elastomer.

In a fourth aspect of the present invention, is provided a method of enhancing processability of an elastomer, comprising: (A) providing an elastomer composition according to the present invention, wherein the at least one polymeric material is present in an amount effective to enhance processability of the elastomer.

As used herein the terminology "($C_1$–$C_{50}$)", "($C_1$–$C_{20}$)", "($C_{20}$–$C_{50}$)", etc., means a straight chain or branched chain alkyl group having from 1 to 50, 1 to 20, 20–50, etc., carbon atoms per group.

As used herein, the expression "(meth)acrylate(s)" is intended to include both methacrylate(s) and acrylate(s) within its scope.

As used herein, the term "elastomer" refers to any polymer which undergoes reversible extensibility and includes both elastomers and thermoplastic elastomers. Also, the term "polymeric" is understood to include within its scope all types of molecules characterized as having repeating units of atoms or molecules linked to each other such as oligomers, homopolymers, co-polymers including block, random and alternating co-polymers, grafted polymers and co-polymers, terpolymers, etc.

The term "PHR" is understood to mean parts per 100 parts elastomer.

Throughout this specification and claims, unless otherwise indicated, references to percentages are by weight, all temperatures by degree centigrade and all pressures are atmospheric.

It is also to be understood that for purposes of this specification and claims that the range and ratio limits, recited herein, are combinable. For example, if ranges of 1–20 and 5–15 are recited for a particular parameter, it is understood that ranges of 1–15 or 5–20 are also contemplated.

As indicated above, the elastomer compositions of the present invention include at least one elastomer. The elastomer is generally present in the elastomer composition from 20 to 99.9, preferably 40 to 99.9, more preferably 60 to 99.9 percent by weight of the elastomer composition.

Generally, any suitable elastomer may be used in the elastomer compositions of the present invention. Preferably, the elastomer is a thermosetting, crosslinking elastomer. Suitable elastomers include, but are not limited to, natural rubbers; modified natural rubbers including those grafted with acrylates or those which are halogenated; styrene-butadiene elastomers such as styrene-butadiene rubber (SBR), solution SBR (SSBR), carboxylated SBR (XSBR), high styrene-butadiene copolymer (HS/B), pyridine(vinyl)-styrene-butadiene rubber (PSBR); chloroprene elastomers such as poly-chloroprene elastomers (CR) and carboxylated polychloroprene rubber (XCR); polybutadiene elastomers including 1–2 isomers, hydroxyl, carboxyl, emulsion polybutadiene rubber(EBR), and halogen terminated polybutadiene elastomers; butyl elastomers such as polyisoprene elastomers (IR), isoprene/isobutylene elastomers (IIR), halogenated butyl rubber (HIIR) such as bromobutyl elastomer, chlorobutyl elastomer, and poyisobutylene elastomers; nitrile elastomers such as acrylonitrile-butadiene elastomers (NBR), carboxylated NBR (XNBR), hydrogenated and partially hydrogenated acrylonitrile-butadiene elastomer (HNBR), nitrile-isoprene elastomers (NIR); polyethylene elastomers such as chlorinated polyethylene elastomer and chlorosulfonated-ethylene elastomer; ethylene-propylene elastomers such as co-polymers (EPM) and terpolymers (EPDM) of ethylene and propylene; acrylic based elastomers such as acrylate elastomers (AM), acrylate butadiene elastomer (ABR), and ethylene-acrylic elastomers; silicone elastomers such as organopolysiloxane elastomers; fluoroelastomers; epichlorohydrin elastomer; polyalkenamer elastomers such as elastomers prepared, for instance, from cyclooctene, cyclopentene, or 1,5-cyclooctadiene monomers; organic polysulfide elastomers; urethane elastomers; and mixtures or blends thereof. In one embodiment, the at least one elastomer is a styrene-butadiene elastomer, chloroprene elastomer, butyl elastomer, polybutadiene elastomer, nitrile elastomer, polyethylene elastomer, ethylene-propylene elastomer, acrylic elastomer, silicone elastomer, fluoroelastomer, epichlorohydrin elastomer, polyalkenamer elastomer, polysulfide elastomer, urethane elastomer, mixtures thereof or blends thereof. In a preferred embodiment, the at least one elastomer is an acrylonitrile-butadiene elastomer, hydrogenated acrylonitrile-butadiene elastomer, partially hydrogenated acrylonitrile-butadiene elastomer, modified polyethylene elastomers such as chlorinated or chlorosulfonated polyethylene elastomer, ethylene-acrylic elastomer, styrene-butadiene elastomer, fluoroelastomer, or mixtures or blends thereof. In a more preferred embodiment, the at least one elastomer is acrylonitrile-butadiene elastomer, hydrogenated acrylonitrile-butadiene elastomer, partially hydrogenated acrylonitrile-butadiene elastomer, fluoroelastomer, mixtures thereof or blends thereof. In a most preferred embodiment, the at least one elastomer is a fluoroelastomer.

The elastomer may also be a thermoplastic-elastomer (TPE) having an elastomeric component and a thermoplastic component. Suitable examples include, but are not limited to polyolefin thermoplastic elastomers, polyester/polyether thermoplastic elastomers, thermoplastic elastomers based on isoprene homopolymers and co-polymers, and urethane thermoplastic elastomers.

The elastomer compositions of the present invention also include at least one polymeric material formed from at least one ethylenically unsaturated monomer. The polymeric material is generally present in the elastomer composition from 1 to 100, preferably 1 to 50, more preferably 2 to 30 PHR. Generally, the at least one polymeric material present in the elastomer has a weighted average molecular weight (Mw) of 500 to 1,000,000, preferably 500 to 500,000, more preferably 500 to 100,000, most preferably 500 to 50,000.

Ethylenically unsaturated monomers which are useful as monomers in the present invention include acrylic and methacrylic acid and esters thereof. Generally, the (meth) acrylates are $C_1$ to $C_{50}$ (meth)acrylates.

Examples of the alkyl methacrylate or alkyl acrylate where the alkyl group contains from 1 to 6 carbon atoms (also called the "low-cut" alkyl methacrylate or alkyl acrylate), are methyl methacrylate (MMA), ethyl methacrylate (EMA), methyl and ethyl acrylate, propyl methacrylate, butyl methacrylate (BMA) and acrylate (BA), isobutyl methacrylate (IBMA), hexyl and cyclohexyl methacrylate, cyclohexyl acrylate and combinations thereof.

Examples of the alkyl methacrylate or alkyl acrylate where the alkyl group contains from 7 to 15 carbon atoms (also called the "mid-cut" alkyl methacrylates or alkyl acrylates), are 2-ethylhexyl acrylate (EHA), 2-ethylhexyl methacrylate, octyl methacrylate, decyl methacrylate, isodecyl methacrylate (IDMA, based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and combinations thereof. Also useful are: dodecyl-pentadecyl methacrylate (DPMA), a mixture of linear and branched isomers of dodecyl, tridecyl, tetradecyl and pentadecyl methacrylates; and lauryl-myristyl methacrylate (LMA), a mixture of dodecyl and tetradecyl methacrylates.

Examples of the alkyl methacrylate or alkyl acrylate where the alkyl group contains from 16 to 24 carbon atoms (also called the "high-cut" alkyl methacrylates or alkyl acrylates), are hexadecyl methacrylate, heptadecyl methacrylate, octadecyl methacrylate, nonadecyl methacrylate, cosyl methacrylate, eicosyl methacrylate and combinations thereof. Also useful are: cetyl-eicosyl methacrylate (CEMA), a mixture of hexadecyl, octadecyl, cosyl and eicosyl methacrylate; and cetyl-stearyl methacrylate (SMA), a mixture of hexadecyl and octadecyl methacrylate. Mixtures of one or more of low-cut, mid-cut or high-cut (meth)acrylates may also be used.

In one embodiment, the at least one monomer is a $C_{10}$ to $C_{20}$ alkyl (meth)acrylate monomer and the at least one polymeric material is a homopolymer or co-polymer of at least one $C_{10}$ to $C_{20}$ alkyl (meth)acrylate monomers. In a preferred embodiment, the at least one monomer is lauryl methacrylate, stearyl methacrylate, isomers thereof or a mixture thereof and the at least one polymeric material is a homopolymer of lauryl methacrylate monomer or stearyl methacrylate monomer or a co-polymer of lauryl and stearyl methacrylate monomers.

In one embodiment, the at least one monomer is a mixture of the $C_{10}$ to $C_{20}$ alkyl (meth)acrylate monomers described above. For instance, such mixtures include, but are not limited to, mixtures of $C_{12}$–$C_{14}$ monomers, or mixtures of $C_{18}$–$C_{20}$ monomers. In another embodiment, the monomer is a (meth)acrylate and the polymeric material is a terminally unsaturated (meth)acrylate oligomer. In one embodiment, the terminally unsaturated (meth)acrylate oligomer has at least 30 percent, preferably at least 50 percent, and more preferably at least 60 percent terminal unsaturation in the oligomeric chain. In another embodiment, the terminally unsaturated butyl acrylate oligomer has 30 percent to 100 percent, preferably 50 percent to 90 percent, more preferably 60 percent to 80 percent terminal unsaturation in the oligomeric chain. In a preferred embodiment, the monomer is butyl acrylate and the polymeric material is a terminally unsaturated butyl acrylate oligomer.

The mid-cut and high-cut alkyl methacrylate and alkyl acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed Alfol alcohols from Vista Chemical company, i.e. Alfol 1618 and Alfol 1620, Ziegler catalyzed various Neodol alcohols from Shell Chemical Company, i.e. Neodol 25L, and naturally derived alcohols such as Procter & Gamble's TA-1618 and CO-1270. Consequently, for the purposes of this invention, the term alkyl (meth)acrylate is intended to include not only the individual alkyl (meth)acrylate product named, but also to include mixtures of the alkyl (meth)acrylates with a predominant amount of the particular alkyl (meth)acrylate named.

Another class of suitable ethylenically unsaturated monomers is vinylaromatic monomers which includes, among others, styrene, α-methylstyrene, vinyltoluene, p-methylstyrene, ethylvinylbenzene, vinylnaphthalene, vinylxylenes, and the like. The vinylaromatic monomers can also include their corresponding substituted counterparts, such as halogenated derivatives, i.e., containing one or more halogen groups, such as fluorine, chlorine or bromine; and nitro, cyano, alkoxy, haloalkyl, carbalkoxy, carboxy, amino, alkylamino derivatives and the like.

Another class of suitable ethylenically unsaturated monomers is nitrogen-containing ring compounds and their thioanalogs, such as vinylpyridines such as 2-vinylpyridine or 4-vinylpyridine, and lower alkyl ($C_1$–$C_8$) substituted C-vinyl pyridines such as: 2-methyl-5-vinyl-pyridine, 2-ethyl-5-vinylpyridine, 3-methyl-5-vinylpyridine, 2,3-dimethyl-5-vinyl-pyridine, 2-methyl-3-ethyl-5-vinylpyridine; methyl-substituted quinolines and isoquinolines, N-vinylcaprolactam, N-vinylbutyrolactam, N-vinylpyrrolidone, vinyl imidazole, N-vinyl carbazole, N-vinyl-succinimide, acrylonitrile, o-, m-, or p-aminostyrene, maleimide, N-vinyl-oxazolidone, N,N-dimethyl aminoethyl-vinyl-ether, ethyl-2-cyano acrylate, vinyl acetonitrile, N-vinylphthalimide. Also included are N-vinyl-thio-pyrrolidone, 3 methyl-1-vinyl-pyrrolidone, 4-methyl-1-vinyl-pyrrolidone, 5-methyl-1 -vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone, 3,4,5-trimethyl-1-vinyl-pyrrolidone, and other lower alkyl substituted N-vinyl-pyrrolidones.

Another class of suitable ethylenically unsaturated monomers is substituted ethylene monomers, such as vinyl acetate, vinyl chloride, vinyl fluoride, vinyl bromide, vinylidene chloride, vinylidene fluoride, vinylidene bromide, acrylonitrile, methacrylonitrile, acrylic acid and corresponding amides and esters, methacrylic acid and corresponding amides and esters.

Another class of acrylic and methacrylic acid derivatives is represented by substituted alkyl acrylate and methacrylate and substituted acrylamide and methacrylamide monomers. Examples include (meth)acrylates wherein the alkyl group is substituted with halogen, such as fluorine, chlorine or bromine; and nitro, cyano, alkoxy, haloalkyl, carbalkoxy, carboxy, amino, alkylamino derivatives and the like.

Each of the substituted monomers can be a single monomer or a mixture having different numbers of carbon atoms in the alkyl portion. In one embodiment, the monomers are selected from the group consisting of hydroxy-$(C_2-C_6)$ alkylmethacrylates, hydroxy$(C_2-C_6)$alkyl acrylates, dialkylamino$(C_2-C_6)$-alkylmethacrylates, dialkylamino $(C_2-C_6)$alkyl acrylates, dialkylamino$(C_2-C_6)$alkyl methacrylamides and dialkylamino$(C_2-C_6)$alkyl acrylamides. The alkyl portion of each monomer can be linear or branched.

Examples of substituted alkyl methacrylate and acrylate monomers with one or more hydroxyl groups in the alkyl radical, especially those where the hydroxyl group is found at the β-position (2-position) in the alkyl radical. Hydroxyalkyl methacrylate and acrylate monomers in which the substituted alkyl group is a $(C_2-C_6)$alkyl, branched or unbranched, are preferred. Among the hydroxyalkyl methacrylate and acrylate monomers suitable for use in the present invention are 2-hydroxyethyl methacrylate (HEMA), 2-hydroxyethyl acrylate(HEA), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate. The preferred hydroxyalkyl methacrylate and acrylate monomers are HEMA, 1-methyl-2-hydroxyethyl methacrylate and 2-hydroxypropyl methacrylate. A mixture of the latter two monomers is commonly referred to as "hydroxypropyl methacrylate" or HPMA.

Additional examples of substituted (meth)acrylate monomers are those alkyl methacrylate and acrylate monomers with a dialkylamino group in the alkyl radical, such as dimethylaminoethyl methacrylate, dimethylaminoethyl acrylate and the like.

Other examples of substituted (meth)acrylate monomer are nitrogen-containing ring compounds (previously described) and dialkylaminoalkyl methacrylamide and acrylamide monomers, such as N,N-dimethylaminoethyl methacrylamide, N,N-dimethyl-aminopropyl methacrylamide, N,N-dimethylaminobutyl methacrylamide, N,N-di-ethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and the like.

Another group of ethylenically unsaturated monomers are $C_{20}$ to $C_{50}$ (meth)acrylates formed from $C_{20}$ to $C_{50}$ synthetic alcohols. Generally, the (meth)acrylates are formed by reacting a $C_{20}$ to $C_{50}$ synthetic alcohols or ethoxylate thereof with a low-cut alkyl (meth)acrylate in the presence of a zirconium catalyst and suitable inhibitor. Suitable alcohols or ethoxylates are available from Baker Petrolite, Inc. St. Louis, Mo. as Unilin™ or Unithox™ products. In one embodiment, the at least one monomer is a (meth)acrylate monomer product prepare from a $C_{20}$ to $C_{50}$ alcohol or ethoxylate. Suitable examples of such monomers and preparation of the same are disclosed and described in U.S. Pat. No. 5,856,611 issued Jan. 5, 1999.

The elastomer compositions of the present invention also include a curing agent. The curing agent is generally present from 0.1 to 30, preferably from 0.5 to 20, more preferably from 1 to 20 PHR.

Suitable examples include sulfur such as powdery, colloidal, precipitated, insoluble and dispersible sulfurs; sulfur containing organic compounds capable of releasing active sulfur with thermal dissociation such as tetramethylthiuram disulfide and 4,4'-dithiomorpholine; organic peroxides such as 2,5-dimethyl-2,5-di(t-butylperoxy)hexyne, 2,5-dimethyl-2,5-di(t-butylperoxy)hexane, 1,3-bis(t-butylperoxy)isopropylbenzene, dicumyl peroxide, dibutyl peroxide, 1,1-di-t-butylperoxy-3,3,5-trimethylcyclohexane, t-butylcumyl peroxide, t-butylperoxy-isopropyl carbonate; metal oxides such as zinc oxide, magnesium oxide, and lead oxide; quinome dioximes such as p-quinone dioxime and p,p'-dibenzoylquinone oxime; modified alkyl phenolic resins; polyisocyanates; polyamines such as triethyleneteramine, methylenedianiline and diethylenetriamine; metal soaps including sodium stearate and potassium stearate; carboxylic acids and ammonium salts of carboxylic acids such as adipic acid, octadecyldicarboxylic acid, ammonium stearate and ammonium adipate; acid anhydrides such as maleic anhydride, pyromellitic anhydride, and dodecenylsuccinic anhydride; dithiocarbamic acids such as hexamethylenediamine carbamate and zinc dimethyldithiocarbamate; polyepoxides such 1,6-hexanediol diglycidyl ether and ethylene glycol diglycidyl ether; and polyols such as 1,4-butanediol and 1,1,1-trimethylolpropane.

As is understood by those skilled in the art, the preferred curing agent will depend on the type of elastomer compositions used. For instance, if the elastomer is natural rubber, styrene-butadiene elastomer, butadiene elastomer, or nitrile elastomer the curing agent is generally sulfur, an organic sulfur containing compound, an organic peroxide, etc. If the elastomer is, butyl rubber the curing agent is sulfur, quinone diamine, etc. When the elastomer is urethane rubber the curing agent is a polyisocyanate, a polyamine, an organic peroxide, etc. When the elastomer is ethylene-propylene copolymer the curing agent is sulfur, organic peroxide, etc. When the elastomer is a fluoroelastomer the curing agent is an organic peroxide.

The elastomer compositions of the present invention may also include a crosslinking accelerator to be used in combination with the curing agent. The accelerator provides shortening of cross-linking time, lowering of cross-linking temperature, and improvement in the properties of the crosslinked product. The crosslinking accelerator is generally present from 0.1 to 30, preferably from 0.5 to 20, more preferably from 1 to 10 PHR.

Suitable examples of crosslinking accelerators include, but are not limited to mecaptobenzothiazole, tetramethylthiuram disulfide, zinc dimethyl dithiocarbamate, for use with a sulfur curing agent; and 1,3-butanediol dimethacrylate, ethylene glycol dimethacrylate, 1,4-butanediol dimethacrylate, 1,6-hexanediol dimethacrylate, polyethylene glycol dimethacrylate, 1,4-butanediol diacrylate, 1,6-hexanediol diacrylate, 2,2'-bis(4-methacryloyldiethoxyphenyl)propane, trimethylolpropane trimethacrylate, trimethylolpropane triacrylate, pentaerythritol trimethacrylate, divinylbenzene N,N'-methylene (bis) acrylamide, p-quinone dioxime, p,p'-dibenzoylquinone dioxime, triazinedithiol, triallyl cyanurate, triallyl isocyanurate (TAIC), bismaleimide for use with organic peroxide curing agents.

The elastomer compositions of the present invention may also include a filler. The filler is generally present from 5 to 500, preferably from 7.5 to 250, more preferably from 10 to 80 PHR.

Suitable examples of fillers include calcium carbonate; kaolin clay; natural silica such as crystalline silica, microcrystalline silica, and diatomaceaous silica; synthetic silica such as fumed silica, precipitated silica, and silica gel; talc (hydrated magnesium silicate); mica (hydrous potassium aluminum silicate); wollastonite (calcium metasilicate); carbon black or fiber; and glass fiber or spheres.

Other additives commonly utilized in the art may also be incorporated into the elastomer compositions of the present invention. Such additional additives include, but are not limited to, dispersing agents, softening agents, anti-oxidants, pigments, flame retardants, scorch retarders, foaming agents, tackifiers, blowing agents, lubricants, UV-stabilizers, impact modifiers, and the like. Such polymer additives are described for instance in *Plasties Additives and Modzfiers Handbook,* Edenbaum, Jesse, Editor, Van Nostrand Reinhold, New York, 1992.

As recited above, a process for preparing an elastomer composition, includes as a first step providing a mixture of an elastomer, at least one ethylenically unsaturated monomer or at least one polymeric material, having a weighted average molecular weight (Mw) of 500 to 1,000,000, formed from at least one ethylenically unsaturated monomer, and a curing agent. The elastomer, the at least one ethylenically unsaturated monomer, the at least one polymeric material and the curing agent are as described above.

Generally, the mixture is provided by means commonly known in the art. For instance, the mixture may be prepared by combining the constituents using a Banbury mixer, open roll mill, cold lab mill, internal mixer, extrusion mixer, twin roll, or the like. The at least one monomer or at least one polymeric material formed from the at least one monomer is generally added at from 1 to 100, preferably 1 to 50, more preferably 2 to 30 PHR. The curing agent is generally added from 0.1 to 30, preferably from 0.5 to 20, more preferably from 1 to 20 PHR. If used, the additional additives recited above may be added in this step. The amounts of additives used are commonly known in the art.

Once the elastomer mixture is compounded, the composition is cured using methods known in the elastomer art. The curing conditions will vary depending on the elastomer and curing system used and is generally performed according to elastomer manufacturer specifications. However, the curing is generally effected by heating the elastomer composition at a temperature from ambient temperature to 250° C. The actual curing temperature will be dependent on the elastomer composition prepared and on the curing system utilized. During the curing step the elastomer is cured and the monomer if present is polymerized in situ.

Once the elastomer is cured and the monomer is polymerized (if required) the cured elastomer composition may be heat aged or post-cured by subjecting the cured elastomer to heat treatment in, for instance, a forced air oven. As with curing, the heat aging or post-curing temperature will be dependent on the type of elastomer composition used.

The elastomeric compositions of the present invention permits wider use of elastomers in applications of demanding conditions wherein the elastomer is exposed to heat, cold, chemicals, lubricants and the like without migration of the polymeric plasticizer of the present invention. Furthermore, the elastomers would permit a higher level of carbon black or other reinforcing agent or filler into the elastomer thereby improving the properties of the elastomers and/or reducing costs. These properties make them especially useful in down-hole oil drilling and recovery operations, as seals, tubing or hoses in engines and in other applications involving corrosive fluid transfer. As a result, of the chemistry of the elastomeric compositions and of the vast range of compounds available for use as plasticizers it is possible to tailor the plasticizer to the elastomer to maintain compatibility while plasticizing and enhancing processability of the elastomer.

Accordingly, in the elastomer compositions of the present invention the at least one polymeric material is substantially permanent within the elastomer. For the purposes of this specification, including the attached claims, the term substantially permanent means that there will be a minimal amount of loss of the at least one polymeric material plasticizer from the elastomeric composition because of compatibility problems (see below) or in response to an external stimulus such as heat and/or solvent extraction. Generally, the loss of polymeric material (plasticizer) from the elastomer will be less than 10 percent, preferably less than 5 percent, more preferably less than 3 percent, and most preferably less than 1 percent by weight of the total weight of the at least one polymeric material plasticizer.

By compatibility of the at least one polymeric material and the elastomer is meant that the at least one polymeric material plasticizer remains within the elastomer, i.e., maintains it's position within the elastomer during mixing (also is able to be mixed into the elastomer), molding and during use of any piece prepared from the elastomer composition. The plasticizers of the present invention do not change positions or migrate ("bloom") to the surface of the elastomer composition.

As recited above, a method of plasticizing an elastomer is also contemplated. The method includes providing an elastomer composition according to the present invention, wherein the at least one polymeric material is present in an amount effective to plasticize the elastomer. Generally the at least one polymeric material is present from 2 to 100, preferably from 2 to 60, more preferably from 2 to 30 PHR.

Also contemplated, is a method of enhancing processability of an elastomer, including: providing an elastomer composition according to the present invention, wherein the at least one polymeric material is present in an amount effective to enhance processability of the elastomer. Generally, the at least one polymeric material is present from 2 to 30, preferably from 2 to 20, more preferably from 2 to 10 PHR.

The following Examples are provided as an illustration of the present invention.

EXAMPLE 1

| Preparation of Nitrile Rubber Elastomer Composition | |
|---|---|
| | PHR |
| An elastomer mixture containing: | |
| Chemigum N615B | 100 |
| (nitrile rubber from Goodyear - Akron, Ohio) | |
| Akro-Zin Bar 85 | 5 |
| ((85% Zinc disp from Akrochem - Akron, Ohio) | |
| Flectol Pastilles | 3 |
| (processing aid from Harwick - Akron, Ohio) | |
| N 774 carbon Black | 60 |
| (from Cabot - Norcross Georgia) | |
| WB 2222 | 1 |
| (Anti-oxidant from Structol - Stow, Ohio) | |
| Peroximon DCP40 | 6 |
| (40% Dicumyl peroxide from | |
| Akrochem - Akron, Ohio) | | was compounded by combining the materials, on a cold lab mill for ten (10) minutes while not exceeding a temperature of 50 deg C. No plasticizer was included in the elastomer composition. The green elastomer composition was cured into 100 mil test sheets at 160 deg C. for 25 minutes. The cured elastomer material was measured for Tg by DMTA, Shore A Hardness (ASTM D2240), 100% elongation (ASTM D412), elongation @ break % (ASTM D412), tensile strength (ASTM D412), and Die C Tear (ASTM D624). The results are shown in Table 1.

EXAMPLE 2

An elastomer composition was prepared according to the procedure of Example 1, except that 20 PHR of Natrorez 25, a natural resin coal tar derived plasticizer available from Harwick of Akron, Ohio, was added to the composition. The cured elastomer material was measured for Tg by DMTA, Shore A Hardness, 100% elongation, elongation @ break %, tensile strength, and Die C Tear. The results are shown in Table 1.

EXAMPLE 3

An elastomer composition was prepared according to the procedure of Example 1, except that 20 PHR of Paraplex G 25, a polysebacate plasticizer, available from C.P. Hall of Chicago, Ill., was added to the composition. The cured elastomer material was measured for Tg by DMTA, Shore A Hardness, 100% elongation, elongation @ break %, tensile strength, and Die C Tear. The results are shown in Table 1.

EXAMPLE 4

An elastomer composition was prepared according to the procedure of Example 1, except that 20 PHR of lauryl methacrylate (LMA) monomer was added as a plasticizer to the composition, 7.5 PHR of DCP40 was used and the cured elastomer was heat aged at 100 deg C. for 70 hours in a forced air oven. The cured/heat aged elastomer material was measured for Tg by DMTA, Shore A Hardness, 100% elongation, elongation @ break %, tensile strength, and Die C Tear. The results are shown in Table 1.

TABLE 1

| Property | Example 1 (no plasticizer) | Example 2 (Natrorez 25) | Example 3 (Paraplex G 25) | Example 4 (LMA) |
|---|---|---|---|---|
| Tg by DMTA | −5.5° C. | −5.1° C. | −7.5° C. | −11.3° C. |
| Shore A Hardness | 73 | 62 | 62 | 59 |
| 100% elongation | 867 psi | 308 psi | 441 psi | 273 psi |
| elongation @ break % | 245 | 526 | 274 | 420 |
| tensile strength | 3285 psi | 2567 psi | 2397 psi | 2349 psi |
| Die C Tear | 254 | 264 | 193 | 218 |

The physical testing of the elastomer compositions of Examples 1–4 illustrates that the elastomer composition of the present invention (Example 4) is comparably or more efficiently plasticized. The Example 4 elastomer composition has a lower Tg and lower Shore A hardness than the elastomer composition with no plasticizer or those having conventional plasticizers (Examples 1–3). Furthermore, the lower PSI at 100% elongation and the % elongation at break also indicate more efficient plasticization of the elastomer composition of the present invention. Strength in tensile and Die C tear is similar to the elastomer compositions with conventional plasticizers.

EXAMPLES 5–8

Elastomer compositions were prepared as in Examples 1–4. The cured elastomer compositions were tested for solvent resistance by weight loss after immersion in chloroform at 40° C. for 70 hours. The results are depicted in Table 2 as percent weight of extractables, percent weight plasticizer loss and for Example 4, percent plasticizer loss after heat aging. Examples 6 and 7 were not heat aged because of the unavailability of unsaturation on these molecules, during heat aging, which are needed to increase polymer molecular weight.

TABLE 2

| Property | Example 5 (no plasticizer) | Example 6 (Natrorez 25) | Example 7 (Paraplex G 25) | Example 8 (LMA) |
|---|---|---|---|---|
| % wt extractables | 4.5 | 15.1 | 8.5 | 8.3 |
| % wt plast. Loss | 0 | 100 | 41 | 38 |
| % wt loss after heat aging | — | — | — | 13 |

The solvent resistance test using chloroform as a solvent shows the elastomer composition containing the poly-LMA polymerized in situ to be better than the Natrorez 25 containing elastomer composition and slightly better than the Paraplex G 25 containing composition. However, when the composition is heat aged the resistance improves even more. The availability of unsaturation in the poly-LMA allows additional polymerization of the LMA which further lowers extraction of plasticizer from the elastomer composition.

EXAMPLE 9

| Preparation of Fluoroelastomer Composition | |
|---|---|
|  | PHR |
| An elastomer mixture containing: | |
| FLS 2650 | 100 |
| (fluoroelastomer from 3M Co. - St. Paul, Minnesota) | |
| Cri-D 82.5 | 5 |
| (activator from Cri-Tech, Inc. - Hanover, Mass) | |
| TAIC | 2 |
| (cross-link accelerator from Mitsubishi Int'l Corp, New York, NY) | |
| N 330 carbon Black | 30 |
| (Cabot - Norcross, Georgia) | |
| DC 60 | 2 |
| (60% Dicumyl peroxide from Akrochem - Akron, Ohio) | | was compounded by combining the materials in a Banbury mixer and mixing for 15 minutes while not heating up to a temperature of 100 deg C. No plasticizer was included in the elastomer composition. The green elastomer composition was cured at 160 deg C. in a lab press. The cured elastomer material was measured for Tg by DMTA, Shore A Hardness, 100% elongation, elongation @ break %, tensile strength and was observed for molding compatibility. The results are shown in Table 4.

EXAMPLE 10

An elastomer composition was prepared according to the procedure of Example 9, except that 10 PHR of Paraplex G 40, a polysebacate plasticizer, available from C.P. Hall of Chicago, Ill., was added to the composition. The cured elastomer material was measured for Tg by DMTA, Shore A Hardness, 100% elongation, elongation @ break %, tensile strength and was observed for molding compatibility. The results are shown in Table 4.

EXAMPLE 11

An elastomer composition was prepared according to the procedure of Example 1, except that 10phr of poly-LMA/SMA (95:5) copolymer was added to the composition and the elastomer composition was post-cured per recommendations of the manufacturer, 3M Co.

The poly-LMA/SMA (95:5) copolymer was prepared as follows. A 5 liter reaction vessel was fitted with a thermometer, a temperature controller, a purge gas inlet, a water-cooled reflux condenser with purge gas outlet, a stirrer, and an addition funnel. To the addition funnel was charged 3354.91 grams of a homogeneous monomer mixture of 168.39 grams cetyl-stearyl methacrylate (SMA, 96.5% purity), 3134.52 grams lauryl-myristyl methacrylate (LMA, 98.5% purity), 3.25 grams of Vazo-67, and 48.75 grams dodecyl mercaptan. Thirty percent (1006.47grams) of the monomer mixture in the addition funnel was charged to the reaction vessel which was then flushed with nitrogen for ~30 minutes before applying heat to bring the contents of the reaction vessel to 120° C. When the contents of the vessel reached 120° C, the balance of the monomer mixture in the addition funnel was uniformly charged to the reaction vessel over 60 minutes. At the end of the monomer mixture addition, the reaction vessel contents were maintained at 120° C. for 30 minutes. At the end of the 30 minute hold, the polymerization temperature was reduced to 105° C. before adding the first of two discrete chaser shots of initiator, each consisting of 6.50 grams of a Vazo-67. Thirty minutes after adding the first chaser initiator shot, the second chaser shot of initiator was added to the reaction while maintaining the temperature of the reaction vessel contents at 105° C. Thirty minutes after the second initiator chaser shot, the batch temperature was increased to 120° C and held at temperature for 30 minutes to ensure complete consumption of initiator. The product so formed exhibited a polymer solids content of 97.7 wt. % (by GPC assay), a viscosity of 920 cSt at 210° F. and a molecular weight (Mw) of 24,700.

The LMA/SMA product was tested for heat stability. The co-polymer was charged to a flask and heated in an inert atmosphere for about 24 hrs. at 450° F. (232° C.). The samples were run both with (0.5%) and without catalyst (dicumyl peroxide). The results follow in Table 3.

TABLE 3

| Time | Catalyst? | Mw | Mn |
| --- | --- | --- | --- |
| Initial- 0 hours | Yes | 26,800 | 20,900 |
| 2 hours | Yes | 27,600 | 21,200 |
| 6 hours | Yes | 27,300 | 21,100 |
| 22 hours | Yes | 27,400 | 21,100 |
| Initial- 0 hours | No | 26,800 | 20,900 |
| 4 hours | No | 26,500 | 20,800 |
| 20 hours | No | 26,200 | 20,600 |

As illustrated in Table 3, stability at 232° C. was excellent.

The elastomer product was measured for Tg by DMTA, Shore A Hardness, 100% elongation, elongation @ break %, tensile strength and was observed for molding compatibility. The results are shown in Table 4.

EXAMPLE 12

An elastomer composition was prepared according to the procedure of Example 1, except that 10 phr of terminally unsaturated butyl acrylate oligomer (o-BA) was added as a plasticizer to the composition and the cured elastomer composition was post-cured per recommendations of the manufacturer, 3M Co.

The terminally unsaturated o-BA was prepared as follows. A 35% solution of butyl acrylate (BA) monomer in acetone containing di t-butyl peroxide (2% based on monomer) was fed at 5 ml/min. through a high pressure/temperature reactor at 275° C. and 3500 psi. The resultant sample was stripped on a rotovap to remove residual BA monomer and acetone. A proton NMR spectrum of this product was consistent with the expected structure and combined with mass spectroscopy (MS) indicated 70% of the oligomer chains possess terminal unsaturation. An FTIR spectrum of this material showed a carbonyl stretch at 1730–1740 cm$^{-1}$. The product oligomer was a clear, colorless fluid having the following properties:

Res. BA=200 ppm
Total solids=99.3%
Tg=−71° C.
Mw=2100*
Mn=930*
Mw/Mn=2.3
Viscosity=160 cps.

*The molecular weights were determined with gel permeation chromatography using an o-BA standard. The cured elastomer material was measured for Tg by DMTA, Shore A Hardness, 100% elongation, elongation @ break %, tensile strength and was observed for molding compatibility. The results are shown in Table 4.

TABLE 4

| Property | Example 9 (no plasticizer) | Example 10 (Paraplex G 40) | Example 11 (pLMA/SMA) | Example 12 (o-BA) |
| --- | --- | --- | --- | --- |
| Tg by DMTA | 11° C. | — | 12° C. | 8° C. |
| Shore A Hardness | 92 | 95 | 90 | 96 |
| PSI @ 100% elongation | 1296 psi | 918 psi | 778 psi | 810 psi |
| % elongation @ break | 190 | 250 | 300 | 177 |
| tensile strength | 2000 psi | 1325 psi | 1132 psi | 1821 psi |
| molding compatibility | yes | no | yes | yes |

The elastomer composition of the present invention (Examples 11 and 12) has comparable Tg and Shore A hardness with the elastomer composition with no plasticizer or conventional plasticizers (Examples 9 and 10). Furthermore, the lower PSI at 100% elongation and the % elongation at break also indicate efficient plasticization of the elastomer composition of the present invention and exhibit enhanced processability. Strength in tensile is similar to the elastomer compositions with conventional plasticizers. The molding compatibility, that is the ability of the plasticizer to remain in the elastomer composition without a change in position and/or migration (bloomed) to the surface during molding. The elastomer compositions of the present invention exhibited compatibility with the fluoroelastomer whereas the Paraplex containing elastomer composition failed.

EXAMPLES 13–16

The elastomer compositions were prepared as in Examples 9–12. The elastomer compositions were tested for solvent resistance by immersion in diesel fuel at 40° C. for 100 hours. The resultant physicals were measured again and are depicted in Table 5.

TABLE 5

| Property | Example 13 (no plasticizer) | Example 14 (Paraplex 40) | Example 15 (pLMA/SMA) | Example 16 (o-BA) |
|---|---|---|---|---|
| PSI @ 100% elong | 1205 | 959 | 714 | 817 |
| % elong @ break | 179 | 173 | 288 | 216 |
| Tensile PSI | 1708 | 1454 | 1022 | 1193 |

A comparison of the results exhibited in Table 4 (before extraction) and those in Table 5 (after extraction) illustrate the increased resistance to extraction in the elastomer compositions of the present invention and the loss of compatibility of Paraplex 40 during the molding/curing of the elastomer composition. The elastomer compositions of the present invention show comparable or increased plasticization after diesel extraction and the conventional elastomer composition shows a decrease in plasticization when Table 4 (before extraction) and Table 5 (after extraction) are compared.

We claim:

1. An elastomer composition, comprising:

(A) at least one elastomer, (B) a plasticizer comprising at least one polymeric material having a weight average molecular weight, $M_w$, of 500 to 1,000,000, and (C) a curing agent;

wherein the at least one polymeric material is substantially permanent within the elastomer; and wherein the at least one polymeric material consists of:

(i) at least one monormer unit selected from the group consisting of (meth)acrylic acid; $C_{10}$–$C_{50}$alkyl (meth)acrylates; and $C_1$–$C_{50}$alkyl (meth)acrylates substituted with a halogen, a nitro group, a cyano group, a haloalkyl group, a carboxy group, an amino group, an alkylamino group or a dialkylamino group; and (ii) optionally, at least one monomer unit selected from the group consisting of vinylaromatic monomers; vinylaromatic monomers substituted with a halogen, a nitro group, a cyano group, alkoxy group, a haloalkyl group, carbalkoxy group, a carboxy group, an amino group, an alkylamino group or a dialkylamino group; nitrogen-containing ring compounds and thio analogs thereof; nitrogen-containing ring compounds and thio analogs thereof substituted with a $C_1$–$C_8$alkyl group; vinyl acetate; vinyl chloride; vinyl fluoride; vinyl bromide; vinylidene chloride; vinylidene fluoride; vinylidenebromide;(meth)acrylonitrile; (meth) acrylamide; and dialkylamino$C_2$–$C_6$alkyl(meth)acrylamindes.

2. The elastomer composition of claim 1, wherein the at least one polymeric material consists of at least one monomer unit selected from the group consisting of (meth)acrylic acid; $C_{10}$–$C_{50}$alkyl (meth)acrylates; and $C_1$–$C_{50}$alkyl (meth) acrylates substituted with a halogen, a nitro group, a cyano group, a haloalky group, a carboxy group, an amino group, an alkylamino group or a dialkylamino group.

3. The elastomer composition of claim 1, wherein the at least one polymeric material consists of at least one monomer unit selected from the group consisting of $C_{10}$–$C_{20}$alkyl (meth)acrylates; and $C_1$–$C_{20}$alkyl (meth)acrylates substituted with a halogen, a nitro group, a cyano group, a haloalkyl group, a carboxy group, an amino group, an alkylamino group or a dialkylamino group.

4. The elastomer composition of claim 1, wherein the at least one polymeric material consists of at least one monormer unit selected from the group consisting of $C_{20}$–$C_{50}$alkyl (meth)acrylates; and $C_{20}$–$C_{50}$alkyl (meth) acrylates substituted with a halogen, a nitro group, a cyano group, a haloalkyl group, carboxy group, an amino group, an alkylamino group or a dialkylamino group.

5. The elastomer composition of claim 1, wherein the at least one polymeric material is a terminally unsaturated oligomer.

6. The elastomer composition of claim 1, wherein the at least one polymeric material consists of units of lauryl methacrylate.

7. The elastomer composition of claim 1, wherein the at least one polymeric material consists of a mixture of units of lauryl methacrylate and stearyl methacrylate.

8. The elastomer composition of claim 1, wherein the at least one elastomer is selected from the group consisting of styrene-butadiene elastomer, chloroprene elastomer, butyl elastomer, polybutadiene elastomer, nitrile elastomer, polyethylene elastomer, ethylene-propylene elastomer, acrylic elastomer, silicone elastomer, fluoroelastomer, epichlorohydrin elastomer, polyalkenamer elastomer, polysulfide elastomer, urethane elastomer, mixtures thereof and blends thereof.

9. The elastomer composition of claim 1, further comprising a filler.

10. The elastomer composition of claim 9, wherein the filler is selected from the group consisting of carbon black, carbon fiber, calcium carbonate, natural and synthetic silica, talc, mica, wollastonite, glass spheres and glass fiber.

11. The elastomer composition of claim 1, further comprising a crosslinking accelerator.

12. A method of plasticizing an elastomer, comprising:

(A) providing an elastomer composition according to claim 1, wherein the at least one polymeric material is present in an amount effective to plasticize the elastomer.

13. The method of claim 12, wherein the polymeric material is present from 2 to 100 PHR.

14. A method of enhancing processability of an elastomer, comprising:

(A) providing an elastomer composition according to claim 1, wherein the at least one polymeric material is present in an amount effective to enhance processability of the elastomer.

15. The method of claim 14, wherein the polymeric material is present from 2 to 30 PHR.

* * * * *